(12) United States Patent
Dall'Aglio et al.

(10) Patent No.: US 11,779,146 B2
(45) Date of Patent: Oct. 10, 2023

(54) EXTRACTION FILTER BASKET

(71) Applicants: Sauro Dall'Aglio, Seattle, WA (US);
Angelo Dall'Aglio, Bologna (IT)

(72) Inventors: Sauro Dall'Aglio, Seattle, WA (US);
Angelo Dall'Aglio, Bologna (IT)

( * ) Notice: Subject to any disclaimer, the term of this patent is extended or adjusted under 35 U.S.C. 154(b) by 810 days.

(21) Appl. No.: 16/742,770

(22) Filed: Jan. 14, 2020

(65) Prior Publication Data

US 2021/0212499 A1 Jul. 15, 2021

(51) Int. Cl.
*A47J 31/06* (2006.01)

(52) U.S. Cl.
CPC ................ *A47J 31/0663* (2013.01)

(58) Field of Classification Search
CPC .... A47J 31/0663; A47J 31/0642; A47J 31/06; A47J 31/4496; A47J 31/0615; A47J 31/0657; A47J 31/0668; A47J 31/0673; A47J 31/02; A47J 31/3695; A47J 31/4403; A47J 31/0605; A47J 31/0689; A47J 31/34; A47J 31/446; A47J 31/005; A47J 31/0621; A47J 31/0626; A47J 31/085; A47J 31/303; A47J 31/3676; A47J 31/369; A47J 31/407; A47J 31/4464; A47J 31/047; A47J 31/057; A47J 31/061; A47J 31/0647; A47J 31/0684; A47J 31/08; A47J 31/18; A47J 31/22; A47J 31/3628; A47J 31/3633; A47J 31/3638; A47J 31/368; A47J 31/404; A47J 31/4407; A47J 31/441; A47J 31/4467; A47J 31/4485; A47J 31/4492; A47J 31/46; A47J 31/462; A47J 31/467; A47J 43/042; A23L 2/385; A23L 2/54; A23L 3/36; A23F 3/18; A23F 5/262; A23F 5/243; B65D 85/8061; (Continued)

(56) References Cited

U.S. PATENT DOCUMENTS 5,447,631 A * 9/1995 Mahlich .............. A47J 31/0663
210/477
10,349,772 B1 * 7/2019 Fedele .................... A47J 31/06
(Continued)

FOREIGN PATENT DOCUMENTS

CN 207590502 U * 7/2018
EP 2220971 A1 * 8/2010 .......... A47J 31/0615
(Continued)

*Primary Examiner* — Tu B Hoang
*Assistant Examiner* — Vy T Nguyen
(74) *Attorney, Agent, or Firm* — FisherBroyles, LLP; Jeremy P. Sanders

(57) ABSTRACT

A filter basket for a beverage machine includes a sidewall and a strainer portion. The filter basket forms a brew chamber into which ground coffee or other products are added. The brew chamber is defined by a sidewall, a strainer surface, and a smooth contour between the tapered sidewall and the strainer surface. The brew chamber is defined by smooth lines to create better fluid flow through the extraction process. A plurality of apertures are formed in the strainer surface to filter out large particles while allowing brewed beverage to flow therethrough. The tapered sidewalls in combination with the strainer surface, the smooth contour, and the unique pozzetto shape, result in a pressure (Continued)

profile and fluid flow characteristics that reduce the tendency of channeling through the ground coffee and result in a more consistent and uniform extraction.

8 Claims, 6 Drawing Sheets

(58) Field of Classification Search
CPC .............. B65D 85/8043; B65D 65/466; B65D 85/804; B65D 85/8046; B65D 85/8052; B65D 2565/385; B65D 85/8055; B65D 51/22; B65D 81/00; B65D 85/8049; B65D 85/8058; B65D 21/02; B65D 65/02; B65D 77/003; B65D 77/20; B65D 77/22; B65D 85/8064
USPC ......... 99/295, 323, 302, 279, 306, 287, 294, 99/299, 303, 321, 322; 426/433, 435, 77, 426/110, 82; 220/574, 912, 105, 185; 210/477, 455, 474, 498, 282, 479, 481, 210/482, 483, 494.2, 499
See application file for complete search history.

(56) References Cited

U.S. PATENT DOCUMENTS

| | | | | |
|---|---|---|---|---|
| 2002/0015768 | A1* | 2/2002 | Masek | B65D 85/8046 426/115 |
| 2004/0107841 | A1* | 6/2004 | Cai | A47J 31/4496 99/302 R |
| 2010/0236420 | A1* | 9/2010 | Remo | A47J 31/0657 99/299 |
| 2014/0037803 | A1* | 2/2014 | Hansen | B65D 85/8052 426/115 |
| 2017/0055761 | A1* | 3/2017 | Roberts | A47J 31/407 |
| 2020/0383513 | A1* | 12/2020 | Leach | A47J 31/0615 |
| 2022/0008849 | A1* | 1/2022 | Arcangeli | A47J 31/0663 |

FOREIGN PATENT DOCUMENTS

| | | | | |
|---|---|---|---|---|
| EP | 3769648 A1 * | 1/2021 | | A47J 31/06 |
| WO | WO-2019012280 A1 * | 1/2019 | | |

* cited by examiner

EXTRACTION FILTER BASKET

BACKGROUND

The field of the present disclosure is related to extraction of compounds from plant materials, such as coffee beans, pods, tea leaves and any type of powder or grinded-triturate compounds and more specifically, to a reusable filter basket for use with extraction equipment.

Prior methods and apparatuses of extracting compounds can result in less than ideal extraction conditions caused by uneven material distribution of material within the extraction chamber, uneven pressure within the extraction chamber, and uneven liquid flow characteristics, which results in inconsistent extractions, wasted material, and less than ideal flavors from the extracted compounds.

While extraction of compounds from plant materials is possible from current apparatuses and methods, it would be desirable to provide improvements that result in more consistent extractions, and other features that will become apparent from the following description.

SUMMARY

According to some embodiments, a beverage machine filter basket includes a circumferential rim; a tapered or constant-diameter sidewall depending from the rim; a funnel region depending from the tapered sidewall, the funnel region having a first diameter adjacent the tapered sidewall, and a second diameter spaced from the first diameter, the second diameter smaller than the first diameter; a curved transition between the tapered sidewall and the funnel region; and a strainer having a plurality of apertures formed therethrough.

In some embodiments, the filter basket has a central axis and the tapered sidewall forms an angle with respect to the central axis. The angle may be less than 20 degrees, or less than about 15 degrees, or less than about 10 degrees in some embodiments. In some instances, the curved transition between the tapered sidewall and the funnel region has a radius of curvature of greater than 0.25 mm and less than 20 mm. In some instances, the radius of curvature is between about 0.25 mm and 4 mm, or may be between 3 mm and 4 mm. In some cases, the radius of curvature is about 1 mm, 1.5 mm, 2 mm, 3 mm or 4 mm.

In some embodiments, the strainer defines a curved surface, which may be concave when viewed from the inside of the filter basket. The curved surface may have a radius of curvature that is greater than an overall height of the filter basket. In some instances, the plurality of apertures are arranged within a bounded area that is less than 90% of the surface area of the strainer. For example, where the strainer surface forms a circle when viewed from the top, an arrangement of the apertures fits within an area that is less than 90% of the overall surface area of the strainer. In other words, the apertures are not formed throughout the entire strainer surface area, but are limited to an area less than the full surface area of the strainer. In some cases, the plurality of apertures are arranged within a bounded area that is less than the entire area of the strainer, such as less than 80%, or 70%, or 60%, or 50% of the surface area of the strainer.

In some embodiments, the tapered sidewall, funnel region, and strainer together form a brew chamber. In use, material (e.g., ground coffee beans) can be placed into the brew chamber. In some examples, the brew chamber has a diameter that continually reduces in size from a top of the filter basket adjacent the rim to a bottom of the strainer.

According to some embodiments, a beverage machine filter basket includes a circumferential rim, a tapered sidewall depending from the circumferential rim, and a strainer depending from the tapered sidewall, the strainer forming a curved surface.

In some instances, the tapered sidewall continuously tapers from a first diameter adjacent the rim to a second diameter adjacent the strainer, the second diameter being less than the first diameter. A plurality of apertures may be formed within the curved surface of the strainer. In some cases, the plurality of apertures are arranged in a pattern, the pattern having a radius less than 90% of the radius of the strainer.

In some embodiments, the tapered sidewall and the strainer form a brew chamber, and the brew chamber may continuously narrow from a first diameter adjacent the rim, to a point at the center of the strainer.

According to some embodiments, a filter basket for a beverage machine such as an espresso machine includes a circumferential rim, the rim defining a lip; a tapered sidewall extending from the rim; and a strainer, the strainer having a plurality of holes formed therein.

The filter basket may have a top adjacent the rim, and a bottom adjacent the strainer, and a diameter of the filter basket may continuously narrow from the top to the bottom. In other words, when measuring the diameter of the filter basket at any point along its height, it will continually narrow from the top to the bottom. Thus, the entire filter basket tapers continuously. The taper may be formed by straight sides, curved sides, or a combination of straight and curved sides.

Additionally, a curved transition between the tapered sidewall and the strainer may be provided having a radius of curvature between 0.5 mm and 12 mm. In some instances, the strainer defines a curved surface, forming a concave surface within a brew chamber.

The embodiments described herein provide numerous advantages over prior filter designs for use in coffee extraction processes. For example, one notable drawback of current systems is the frequent channeling, where a high-pressure fluid stream finds or creates a path of least resistance through the coffee puck, thereby resulting in a volume of pressurized water that makes very little (or no) contact with the ground coffee. The result is non-uniform extraction, an inefficient extraction, and a less than ideal beverage. The embodiments described herein reduce some of the internal flex and backward fluid pressure waves that have a tendency to disrupt the coffee puck and create channeling. The embodiments described herein further smooth the fluid pressure waves and improve consistency and homogeneity of extracted beverages.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1A:
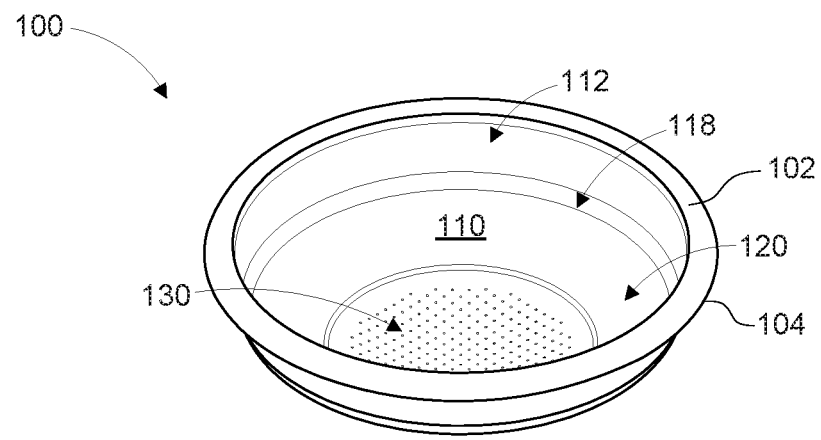
FIG. 1A shows a filter basket useful with beverage extraction machines from the perspective view, in accordance with some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

According to some embodiments, the systems and methods described herein are useful for extraction of compounds from plant materials, and in some cases, are useful for extracting compounds from coffee beans using water as the solvent.

Coffee beans are typically roasted in order to reduce the complex sugars and to caramelize some of the simple sugars within the coffee bean. In some cases, roasting the coffee beans also breaks down acids in the coffee bean. In some instances, coffee beans are roasted to balance the acidity and sweetness of the bean in order to produce pleasing aromas and flavors once the compounds are extracted from the coffee beans using hot water.

In some instances, the coffee beans are ground and used in an extraction process to produce espresso, or any of a number of other coffee or espresso-based beverages, such as cappuccino, macchiato, latte, cortado, americano, mocha, and other coffee beverages, to name a few examples.

In a typical espresso making process, coffee beans are ground and subjected to near-boiling hot water (e.g., about 200° F. or about 93° C.) at a pressure of about 130 psi (9 bar). As the water passes through the ground coffee beans at pressure, the water dissolves some of the compounds from the coffee bean and the result is a dark, rich, hot coffee-based drink.

An espresso machine brews coffee by forcing pressurized water through a "puck" of ground coffee and a filter. The coffee puck is formed by adding a desired amount of ground coffee to a portafilter and tamping the ground coffee to get a distribution and density within the portafilter. The portafilter is a device with a handle and a filter basket therein. The filter basket holds the coffee puck and the handle is used to secure the portafilter to the coffee machine to thereby form a brewing chamber within the filter basket.

The espresso machine heats water and forces it through the coffee puck and the filter basket and out of the portafilter into a beverage cup. In some embodiments, the filter basket comprises a plurality of filter holes through which the pressurized hot water exits the filter basket and is then directed to a beverage cup. The process of extracting an espresso-based drink in this manner may be referred to as "pulling a shot."

Many factors combine to influence the quality of the extracted beverage. For example, the particulate size of the ground coffee bean, the quality of the bean, the roast of the coffee bean, the heat of the water, the time that the water is in contact with the ground coffee, the distribution of the ground coffee within the filter basket, and the compressed density of the ground coffee beans within the filter basket, among others. Notably, several of these variables are influenced, at least in part, by the filter basket itself.

For example, the filter basket is shaped to form a chamber into which the ground coffee beans are inserted and tamped to provide the coffee puck. The filter basket additionally has a plurality of holes that allow the extracted compounds dissolved into the water to leave the filter basket. The shape of the filter basket controls a pressure profile of the pressurized water forced through the puck. The holes within the filter basket control, to some degree, the flow rate of the water out of the filter basket, thus determining the time that the water is in contact with the ground coffee. Therefore, the configuration of the filter basket can play a dramatic role in the quality of the shot.

The time that the water is in contact with the puck has a dramatic impact on the flavor of the shot. Typically, the first compounds extracted out of the ground coffee are acids and fats, which contribute to a salty and sour taste in the shot. Where the water remains in contact with the ground coffee long enough to continue extraction, sugars become extracted next which contribute sweetness to the extracted shot. Finally, if the extraction process is allowed to continue, plant fibers are broken down and extracted, which contribute a dry, bitter flavor to the shot.

By modifying the time that the heated water is in contact with the ground coffee beans, the flavor of the shot is altered along a continuum from sour, to sweet, to bitter. In most extraction machines, the extraction time is directly related to the pressure of the heated water in combination with the configuration of the filter basket, and more particularly, the shape of the filter basket and the arrangement and configuration of the holes in the filter basket. The particulate size of the ground coffee also plays a part in the extraction time, but this is another variable that can be adjusted to modify the flavors in the shot based on personal preference.

A shot of espresso may be defined by the quality of extraction and the strength of the beverage. In some cases, strength relates to the quantity of dissolved compounds in the beverage. For example, espresso may contain about 7% to 12% dissolved solids and about 88%-93% water. Personal preference may alter the desired dissolved solids, but this range is typical for many espresso-based drinks. The strength of the beverage is also related to the extraction. For example, the volume of water and the time of extraction determine the strength of the beverage.

While each individual consumer may experiment with the above-described variables to determine his own favorite shot, there are some characteristics that may be widely applicable to many coffee drinkers. For example, one undesirable occurrence when pulling a shot is spurting, in which the pressurized water finds a path of least resistance through the coffee puck and a volume of water exits the filter basket with very low solids and is typically seen spraying from the filter basket indicating that the pressurized water stream has not had sufficient time of extraction. This phenomenon may be a result of uneven tamping, uneven grounds distribution, or channeling in which the pressurized water finds or creates a channel through the puck.

In some embodiments, a filter basket can influence the quality of the extraction by altering the flow characteristic of the extraction water. Several advantages will become readily apparent by the following description of improved filter baskets that have unique and novel pozzetto shapes and configurations. As used herein, the term "pozzetto" refers to the internal shape of the bottom of the filter basket, where the strainer is and may be formed as a depression compared to the internal level of the tamping area. In some embodiments, a pozzetto may be an alto, or a relatively shallow strainer, or may be described as basso, which refers to a relatively deep strainer.

Figure 1B:
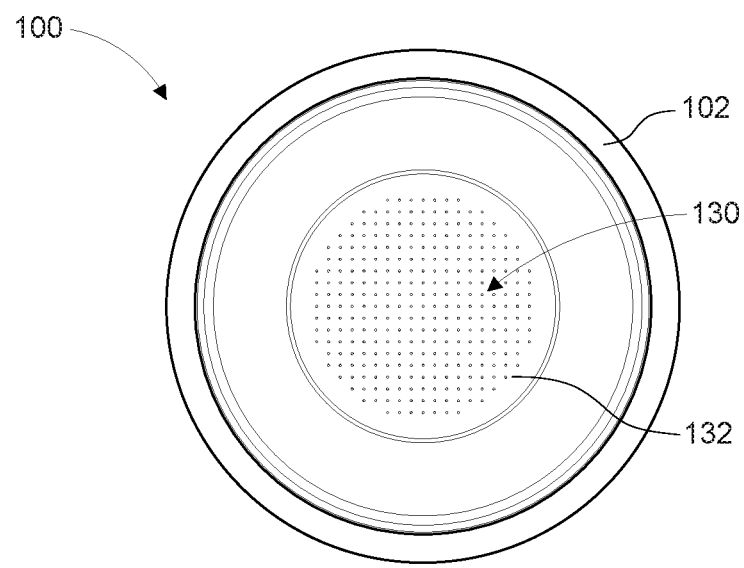
FIG. 1B shows a filter basket useful with beverage extraction machines from a top view, in accordance with some embodiments.
Figure 1C:
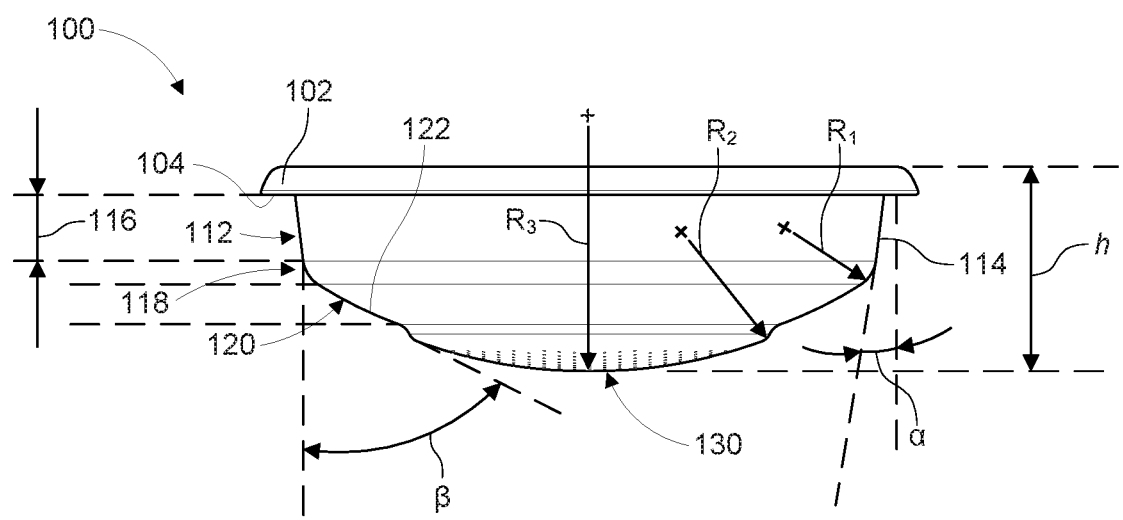
FIG. 1C shows a filter basket useful with beverage extraction machines from a side view, in accordance with some embodiments.

With reference to FIGS. 1A, 1B and 1C, a filter basket 100 is shown in perspective, top and side views respectively. A filter basket 100 is generally circular when viewed from the top, as in FIG. 1B, and has a rim 102 about its top surface and a circumferential lip 104 around the rim 102. In some embodiments, the filter basket 100 is configured for insertion into a portafilter designed to operate with a beverage machine, such as an espresso machine. The lip 104 engages with the portafilter to arrange the filter basket 100 in the proper position and orientation. In some embodiments, the lip 104 creates a fluid tight seal with the portafilter to reduce the likelihood that pressurized fluid will leak from an area between the lip 104 and the portafilter. The portafilter is installed into a beverage machine, and in some embodiments, the rim 102 of the filter basket 100 forms a liquid tight seal with the beverage machine to reduce the likelihood that pressurized fluid will leak from an area between the lip 104 and the beverage machine. The filter basket 100 may have a retaining member that may be in the form of an annular ridge that fits within an annular groove, or may be an annular groove that receives a protruding member, such as a spring or ridge in the portafilter to locate the filter basket and hold it in place within the portafilter. In some cases, the filter basket 100 includes a protrusion that interferes with a structure within the portafilter to maintain the filter basket within the portafilter. The structure within the portafilter may be a spring and the protrusion passes beyond the spring in an inserted configuration and the spring interferes with removal of the filter basket from the portafilter. In some cases, the interference maintains the filter basket 100 within the portafilter, even when a user knocks the portafilter against a knock box, such as to dislodge the coffee puck.

The portafilter with inserted filter basket 100 may be installed into the beverage machine through any suitable mechanism, and in some cases, is installed with a bayonet mount with flanges. Of course, any suitable connection structure may be used to install the portafilter into a beverage machine, as is currently known or may later be developed.

The inside of the filter basket 100 defines a pressure vessel, which may alternatively be referred to as a brew chamber 110. The brew chamber 110 receives a dose of coffee grounds of a predetermined mass, such as between 5 g and 30 g, (e.g., 5 g, 6.5 g, 12 g, 13.5 g, 18 g, or up to 30 g or more) depending on personal preference. The dose of coffee grounds may be formed into a puck, such as by leveling, distributing, tamping, or any combination, within the brew chamber 110. Tamping typically involves using a press that fits within the filter basket to compress the ground coffee therein, thus increasing its density and distributing the ground coffee within the filter basket.

The brew chamber 110 may be formed to have three distinct areas. The first area 112, near the rim 102 of the filter basket 100, is defined by a sidewall 114. In some embodiments, the sidewall 114 is a relatively flat sidewall with no or little curvature. The sidewall 114 may define a draft angle α relative to vertical and therefore be tapered. In some embodiments, the draft angle α is selected to allow the tamping procedure to cause the puck to expand and be forced against the sidewall. The draft angle α additionally encourages the coffee grounds and the water to flow toward the center of the filter basket. In some embodiments, the draft angle α is greater than 0.25 degrees and may be less than about 20 degrees, or less than about 10 degrees, or less than about 8 degrees, or less than about 5 degrees. The first area 112 may have a height 116 within the range of from about 5 mm to about 15 mm, and in some embodiments, is about 9 mm.

Below the first area 112, is a first transition 118 into a funnel area 120. In some embodiments, the first transition 118 defines a smooth curve between the first area 112 and the funnel area 120. According to some embodiments, the first transition 118 has a radius of curvature $R_1$. The radius of curvature $R_1$ may be greater than 0.25 mm, and less than or equal to about 0.5 mm, or 1 mm, or 2 mm, or 3 mm, or 4 mm, or up to 12 mm or more.

The first transition 118 influences the hydrodynamics and pressure profile within the brew chamber 110 and has been shown to provide improvements in the extraction process by reducing channeling thereby getting a more uniform and consistent extraction.

The funnel area 120 is defined by a sidewall 122 having a draft angle β with respect to vertical. According to some embodiments, the draft angle β of the funnel area 120 is within the range of from about 35 degrees to about 80 degrees, and in some instances is about 60 degrees.

The height of the funnel area 120, in some embodiments, may be about 4 mm to about 15 mm. The funnel area 120 defines a tapered region that encourages the coffee grounds poured into the brew chamber 110 to settle toward the bottom of the brew chamber 110 adjacent the strainer 130. Similarly, the funnel area 120 encourages the water to flow toward the bottom of the brew chamber 110 to the strainer 130.

According to some embodiments, the strainer 130 forms the bottom surface of the filter basket 100 and may be formed with a plurality of apertures 132 sized and configured to allow pressurized water to exit the brew chamber 110 with the dissolved compounds. In some embodiments, the apertures 132 may be formed in the strainer through any suitable process, such as punching, drilling, stamping, molding, and the like. The number of holes may vary from one filter basket 100 to another, and may be formed to vary the output flowrate of the filter basket 100. For example, the apertures may be sized, distributed, and numbered to influence the formation of crema within the extracted beverage. Crema may be formed with the beverage when air bubbles combine with fine-ground coffee's soluble oils, and the hole configuration may be designed to influence the crema component of the beverage.

According to some embodiments, a filter basket 100 may be formed with 100 to 500 apertures, such as 100 apertures, or 200 apertures, or 300 apertures, or 400 apertures, or more. In some embodiments, about 100, 150, 250, 350, 450, or 500 apertures may be formed. In some embodiments, the filter basket 100 has a about 250, or 269, or 277, or 293 apertures.

The apertures may be any suitable shape, and may have a generally circular shape. Of course, other aperture shapes are possible and suitable, such as any regular or irregular polygon, and the apertures may be formed to resemble a square, rectangle, or other regular polygon, or irregular shape. According to some embodiments, the apertures may have different shapes. For example, one or more of the apertures 132 may be circular, while others of the one or more apertures may be a different shape, such as a square, oval, or rectangle.

The apertures 132 may be sized to influence the extracted beverage, such as by influencing the brew time of the water in contact with the puck. In some embodiments, the apertures have an average diameter of about 15 microns to about 50 microns or more.

Because the apertures may be formed with variations due to the manufacturing process, an average diameter is given as an example of an average size, and should not limit each aperture to being exactly the same diameter. Other average diameters are possible, such as about 20 microns, 25 microns, 30 microns, 35 microns, 40 microns, or 45 microns. According to some embodiments, one or more holes has an average diameter that is different from another one or more holes. That is, a first group of holes may have an average first diameter and a second group of holes may have an average second diameter that is larger than the average first diameter.

In some embodiments, the strainer surface is formed with a curvature, having a radius of $R_3$. In some embodiments, the strainer surface curvature $R_3$ is greater than the height h of the filter basket 100. In some embodiments, the curved strainer 130 encourages a more uniform fluid flow and a smoother pressure profile within brew chamber. Furthermore, in some embodiments, the curved strainer 130 provides a lowest point on the strainer 130 at which the beverage exiting the plurality of apertures 132 may coalesce to form a fluid stream of beverage from the filter basket into a waiting cup.

In some embodiments, an annular protrusion may be formed in the sidewall 114 of the first area 112 and provide an interference fit, such as with an annular groove, formed in the portafilter. Such cooperating structure may provide an alignment and securement of the filter basket 100 within the portafilter.

Figure 2A:
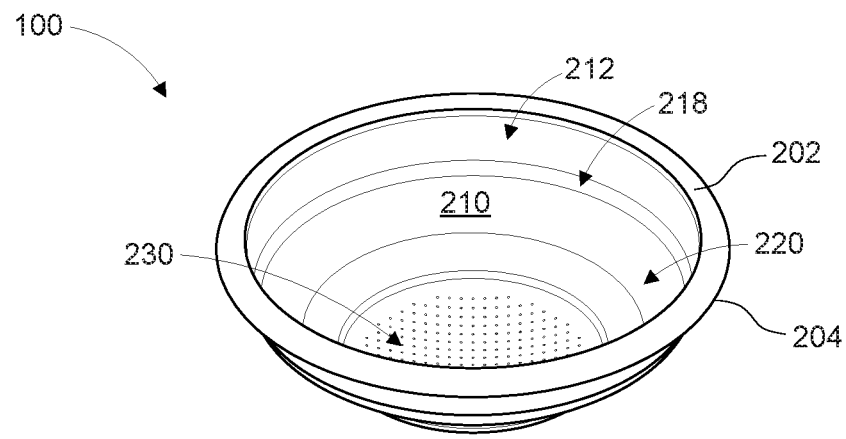
FIG. 2A shows a filter basket useful with beverage extraction machines from the perspective view, in accordance with some embodiments.
Figure 2B:
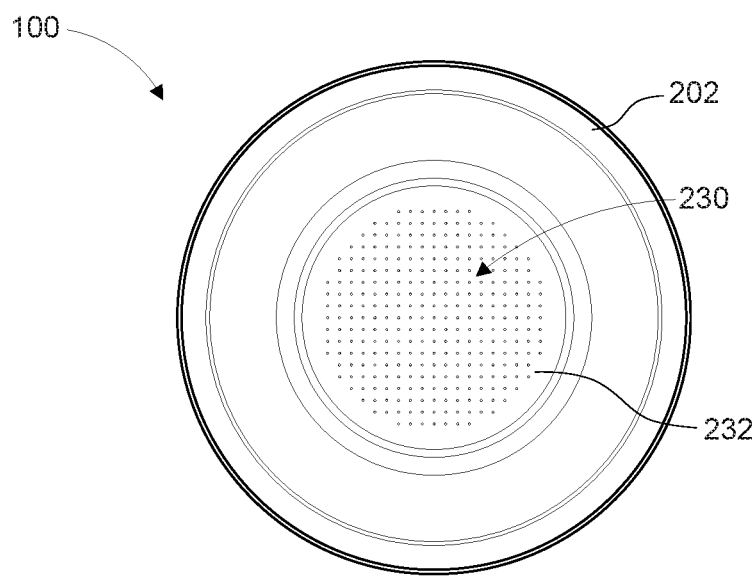
FIG. 2B shows a filter basket useful with beverage extraction machines from a top view, in accordance with some embodiments.

FIGS. 2A, 2B, and show a filter basket 100 in accordance with some embodiments from a perspective, top, and side view respectively. The filter basket 100 may have any suitable diameter and embodiments may be formed with diameters to fit a specific beverage machine. For example, some embodiments may be formed with a diameter of between about 40 mm to 70 mm, such as about 40 mm, 53 mm, 58 mm, 65 mm, 69 mm or some other diameter to mate with a particular portafilter and beverage machine. The embodiments described herein may be formed of any suitable material, but in some embodiments, are formed of stainless steel through any suitable manufacturing process, including stamping, pressing, drilling, punching, folding, machining, or any other suitable manufacturing process or technique.

Figure 2C:
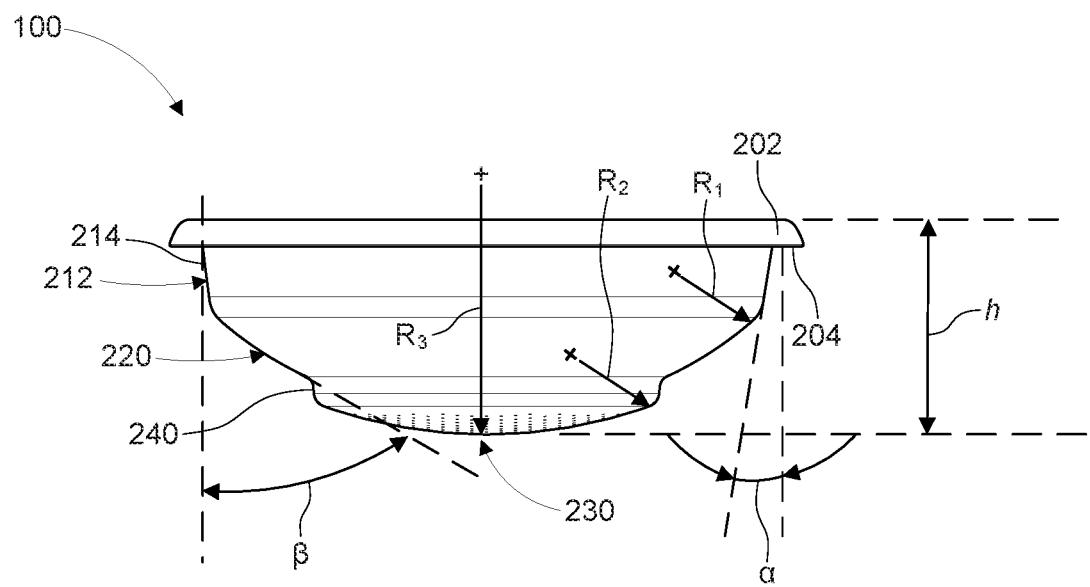
FIG. 2C shows a filter basket useful with beverage extraction machines from a side view, in accordance with some embodiments.

The embodiments shown in FIGS. 2A, 2B, and 2C may be substantially similar to the embodiments described in FIGS. 1A, 1B, and 1C. The embodiments of FIGS. 2A-2C show a deeper pozzetto. More specifically, the strainer 230 may be bounded by a strainer sidewall 240 that affects the overall depth of the filter basket 100. The strainer sidewall 240 creates a transition between the funnel area 220 and the strainer 230. The strainer sidewall 240 may define a radius of curvature $R_2$ as it transitions to the strainer. A smooth curve between the strainer sidewall 240 and the strainer 230 may promote a more uniform fluid flow and reduce channeling. In some embodiments, the radius of curvature $R_2$ between the strainer sidewall 240 and the strainer 230 is greater than about 0.25 mm and less than 16 mm and may be less than or equal to about 0.5 mm, or 1 mm, or 2 mm, or 3 mm, or 4 mm, or 5 mm.

According to some embodiments, a filter basket 100 has a rim 202 configured to create a fluid tight seal when compressed in a beverage machine. A first area 212 is defined by a first sidewall 214 that depends from the rim 202 and gradually reduces in diameter from a first top edge, to a second lower edge. The second lower edge defines a curved transition to a funnel area 220 that reduces in diameter with an angle greater than the first area. The funnel area transitions to a strainer 230. The strainer may have a curved surface defined by a radius of curvature $R_3$. The radius of curvature $R_3$ may be greater than the height h of the filter basket.

The draft angle α of the first sidewall of the first area 212 may be about 0.5 degrees to about 30 degrees with respect to vertical. The angle of the funnel area 220 sidewall may be about 30 degrees to about 80 degrees with respect to vertical. The strainer sidewall 240 may have a draft angle of about 0.5 degrees to about 50 degrees with respect to vertical. As such, the profile of the filter basket 100, as shown in FIG. 2C gradually reduces in diameter from a top of the filter basket 100 to a bottom of the filter basket. In other words, the filter basket 100 has a central axis, and in some embodiments, at each location along the central axis, the diameter of the filter basket narrows from the top of the filter basket to the bottom of the filter basket.

The filter basket 100 has a first area 212 depending from a rim 202. The rim has a lip 204 for engaging with a portafilter of a beverage machine. The first area 212 has a first sidewall 214 that tapers from wide to narrow from the rim 202 to a funnel area 220. Similarly, the funnel area 220 tapers from a top adjacent the first area 212 to a strainer 230. The strainer 230 has a plurality of apertures 232 that allow liquid to pass therethrough. In some embodiments, the apertures 232 are sized to allow liquid to flow therethrough. In some embodiments, the apertures may be sized to have an average diameter of between about 8 microns to about 50 microns, and may be sized to have an average diameter of about 8 microns, 15 microns, 25 microns, 45 microns, 50 microns, or more. The arrangement and number of holes may vary from one embodiment to another, but in some embodiments, there are about from 100 to about 500 apertures 232. In some instances, there are about 100, or 150, or 200, or 250, or 300, or 350, or 400, or 450 apertures 232 formed in the strainer 230.

Figure 3A:
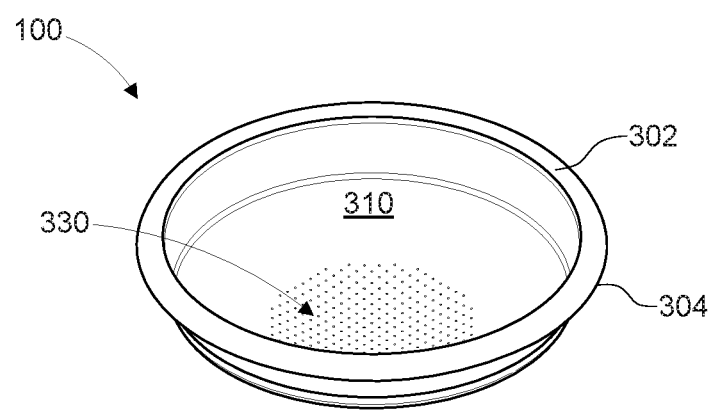
FIG. 3A shows a filter basket useful with beverage extraction machines from the perspective view, in accordance with some embodiments.
Figure 3B:
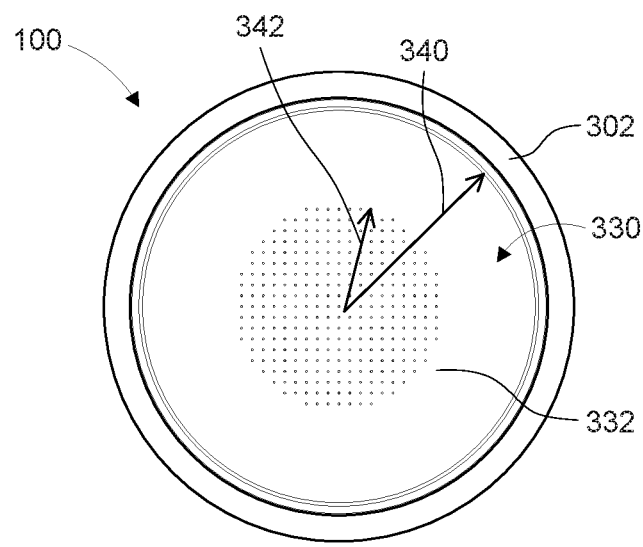
FIG. 3B shows a filter basket useful with beverage extraction machines from a top view, in accordance with some embodiments.
Figure 3C:
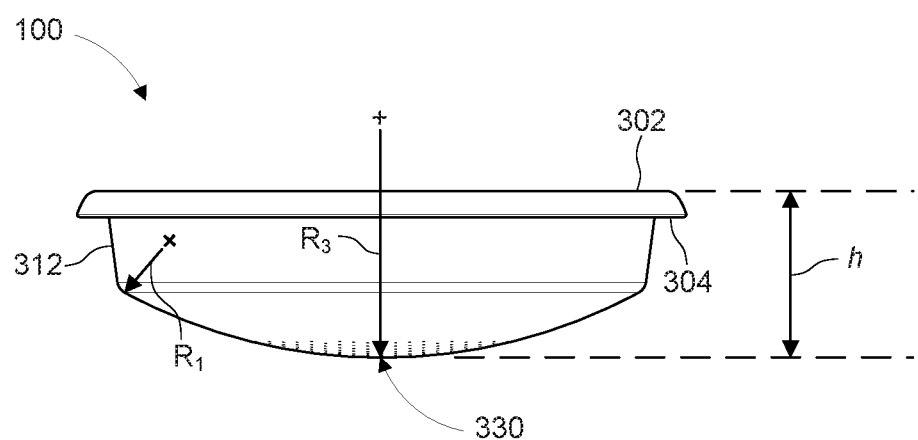
FIG. 3C shows a filter basket useful with beverage extraction machines from a side view, in accordance with some embodiments.

FIGS. 3A, 3B, and 3C show a filter basket 100 from a perspective, top and side view respectively. The filter basket has a rim 302, the rim defining a lip 304. The lip 304 is configured to rest on a portafilter when the filter basket 100 is inserted into the portafilter. As the portafilter, with inserted filter basket 100, is mounted to a beverage machine, the top surface of the rim 302 is configured to create a fluid tight seal with the beverage machine. The interior of the filter basket 100 creates a brew chamber 310. In use, once coffee grounds are placed into the brew chamber and the filter basket is inserted into a portafilter and installed to a beverage machine, hot pressurized water can be introduced into the brew chamber 310 where it dissolves compounds within the coffee grounds and is forced out through the apertures in the strainer 330. The egressing water and dissolved compounds leave the filter basket through the apertures 332 and may be directed to a cup.

The filter basket 100 may have a tapered or in some cases, a constant-diameter, sidewall 312 depending from the rim 302. The tapered sidewall 312 may define an angle with respect to a vertical axis of the filter basket 100, which may be between about 0.5 to about 30 degrees. In some embodiments, the tapered sidewall 312 may define an angle of about 5 degrees, or 8 degrees, or 10 degrees, or 15 degrees. In some embodiments, the tapered sidewall 312 starts at a first diameter adjacent the rim, and gradually reduces to a second diameter. The sidewall 312 transitions to a strainer 330. In some embodiments, the transition between the sidewall 312 and the strainer 330 defines a radius of curvature $R_1$. In some embodiments, the radius of curvature $R_1$ is greater than 0.25 mm and may be less than or equal to about 0.5 mm, or 1 mm, or 2 mm, or 3 mm, or 4 mm, or 5 mm, or 12 mm, or more.

In some embodiments, the radius of curvature $R_1$ encourages a smooth fluid flow within the brew chamber 310 and a pressure profile that may reduce the probability of channeling during use. In some embodiments, the walls of the brew chamber form a smooth continuous curve that influences the flow and pressure of the injected water. In some cases, the smoothness of the brew chamber provides for a more uniform and efficient puck while reducing the tendency of channeling.

The strainer 330 may have a curved surface having a radius of curvature $R_3$ that is greater than the height h of the filter basket. The strainer 330 has a plurality of apertures 332 formed therein that may be arranged in any configuration. In some instances, the plurality of apertures may be arranged in an array of rows and columns. In other instances, the plurality of apertures 332 may be arranged in a radial pattern. In other instances, the plurality of apertures 332 may be arranged in some other configuration, and may approximate a polygon, such as a four-sided, 6-sided, 8-sided, 10-sided, or 12-sided polygon, for example.

In some embodiments, the plurality of apertures are arranged in an area that is less than the overall surface area of the strainer 330. For example, the strainer may have a first diameter, and the plurality of apertures 332 may be arranged within an area having a second diameter that is less than the first diameter. In some embodiments, the plurality of apertures 332 is arranged within a bounded area that is less than 50% of the surface area of the strainer. In some embodiments, the plurality of apertures 332 is arranged within a bounded area that is less than 90%, or 80%, or 75%, or 60% of the surface area of the strainer.

In some embodiments, the filter basket 100 has an axis, and one or more sidewalls that are not parallel to the axis. In some instances, each of the sidewalls of the filter basket 100 is not parallel to the axis. In other words, when viewed from the side, as in FIG. 3C, none of the surfaces that form the brew chamber are vertical, but rather, form an angle relative to the axis that is greater than zero.

In some embodiments, the entirety of the strainer 330 is curved. For example, the strainer 330 may have a first portion that tapers uniformly from a first diameter to a second diameter that is smaller than the first diameter. The strainer 330 may have a curved portion that begins at the second diameter and the curved portion may comprise the plurality of apertures.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

As used herein, the term "or" is used inclusively to refer items in the alternative and in combination. As used herein, characters such as numerals refer to like elements, oftentimes with the first numeral corresponding to a figure number, and the remaining numerals corresponding to like elements in other figures.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A beverage machine filter basket, comprising:
a circumferential rim;
a sidewall depending from the circumferential rim, the sidewall tapered to form an angle with respect to a central axis of the beverage machine filter basket;
a funnel region depending from the sidewall, the funnel region having a first diameter adjacent the sidewall, and a second diameter spaced from the first diameter, the second diameter smaller than the first diameter;
a curved transition between the sidewall and the funnel region; and
a strainer, the strainer having a plurality of uniform apertures formed therethrough;
wherein the sidewall, funnel region, and strainer together form a chamber wherein the strainer depending from the funnel region such that the strainer is located on a bottom of the chamber, wherein, the chamber having a plurality of diameters at different portions of the chamber, and wherein the respective diameters reduce in size from a top of the beverage machine filter basket adjacent the circumferential rim to a bottom of the strainer; and
wherein the beverage machine filter basket is configured for use in a pressurized machine.

2. The beverage machine filter basket as in claim 1, wherein the angle is less than 10 degrees.

3. The beverage machine filter basket as in claim 1, wherein the curved transition between the sidewall and the funnel region has a radius of curvature of greater than 0.25 mm and less than 12 mm.

4. The beverage machine filter basket as in claim 3, wherein the radius of curvature is between 3 mm and 4 mm.

5. The beverage machine filter basket as in claim 1, wherein the strainer defines a curved surface.

6. The beverage machine filter basket as in claim 5, wherein the curved surface has a radius of curvature that is greater than an overall height of the beverage machine filter basket.

7. The beverage machine filter basket as in claim 5, wherein the plurality of uniform apertures are arranged within a bounded area that is less than 90% of a surface area of the strainer.

8. The beverage machine filter basket as in claim 5, wherein the plurality of apertures are arranged within a bounded area that is less than 50% of a surface area of the strainer.

* * * * *